UNITED STATES PATENT OFFICE 2,592,249

PREPARATION OF URONIC ACIDS AND DERIVATIVES THEREOF

Dean H. Couch, China Lake, Calif., and Elonza A. Cleveland, Milan, Italy, assignors to Corn Products Refining Company, New York, N. Y., a corporation of New Jersey No Drawing. Application December 17, 1949, Serial No. 133,690

13 Claims. (Cl. 260—333)

The present invention relates to the production of uronic acid derivatives and uronic acids, and particularly to the production of glucuronic acid, its salts, or its lactone.

Production of a uronic acid from an aldose requires oxidizing the primary alcohol group of the sugar without attacking the aldehyde function. Since the aldehyde function is the group most susceptible to oxidative attack, oxidation of the unmodified sugar never produces any substantial amount of uronic acid.

Oxidation of the primary alcohol group of an aldose molecule in the form of a derivative in which the aldehyde function is suitably protected offers a means of preparing uronic acid derivatives in a form applicable for subsequent processing to obtain the uronic acid or its lactone. However, no oxidant is known which attacks the primary alcohol group of such aldose derivatives specifically. Some of the secondary alcohol groups are oxidized simultaneously and this results in lowered yields of the uronic acid derivative and a mixture of reaction products from which the desired uronic acid derivative is difficult to separate. These difficulties have necessitated complicated and commercially impractical processes for obtaining uronic acids from carbohydrate materials. For example, glucuronic acid has been prepared by a process in which 1,2-isopropylidene glucose was first prepared from glucose and then converted to 1,2-isopropylidene-3,5-benzal glucose. The latter compound was then oxidized with potassium permanganate to form 1,2-isopropylidene - 3,5 - benzal glucuronic acid (Ber. 66, 1326 (1931)). Beta-D-glucose-1,2,3,4-tetraacetate has been oxidized in a similar manner and the product hydrolyzed to obtain glucuronic acid (J. Chem. Soc. 1939, 1530). The yield of glucuronic acid obtained by both these methods was low and the processes are too complicated to be practical for commercial production.

Glucuronic acid has been obtained by hydrolyzing such compounds as bornyl glucuronoside. Such glucuronic acid derivatives can be extracted from the urine of animals which have been fed suitable drugs. This method is tedious, expensive, and obviously entirely unsuitable for large scale production of glucuronic acid.

Commercially feasible methods of preparing glucuronic acid or its lactone or salts or derivatives are desirable since several of these compounds have been found to have therapeutic value. For example, it has been reported (Journal Lancet, 67, 451 (1947)) that glucuronic acid or its salts are of benefit in the treatment of arthritis. Combinations of streptomycin and glucurono-lactone have been found useful in sterilizing the gut prior to surgery. (Bulletin U. S. Medical Department 9, 265 (1949); also paper presented by Pulaski, Connell and Seely at the 98th annual session A. M. A. June 8, 1949.)

Nitrogen dioxide vapor has been utilized to oxidize the primary alcohol groups of the glucose units in carbohydrates such as cellulose, but the product requires drastic conditions for hydrolysis, and production of simple uronic acids by this means has not been reported. Simpler glycosides such as methyl glucoside cannot be oxidized efficiently with nitrogen dioxide vapor, due to the fact that water formed in the reaction rapidly converts the starting material to a pasty, viscous, impervious and generally unreactive mass.

Simple glycosides have been oxidized with nitrogen dioxide while suspended in solvents such as chloroform or carbon tetrachloride. The glycuronoside obtained in this manner can be hydrolyzed to the uronic acid. However, this oxidation process is inefficient, because the system is heterogeneous as the glycoside rapidly forms a viscous dispersed phase due to water formed in the reaction, and it is difficult to maintain sufficient agitation to provide intimate contact between the reactants, which are in separate phases. While the phases can be separated upon completion of the reaction, a substantial amount of the carbohydrate material, including some of the uronic acid derivative produced, remains in the solvent phase and is difficult to recover. Unused oxidant must be recovered from the solvent and the solvent dried before reuse. By reason of these many disadvantages, the production of uronic acids by oxidation with nitrogen dioxide of carbohydrate materials suspended in solvents is an uneconomical process, unattractive for commercial scale operation.

Accordingly, it is an object of this invention to provide an improved method for the production of uronic acids. It is a further object to provide an improved method for the production of uronic acid derivatives. It is still a further object to provide a method of selectively oxidizing the primary alcohol group of aldose sugars in a homogeneous system and produce uronic acids or derivatives thereof. Other objects will appear hereinafter.

We have found that liquid nitrogen dioxide is an excellent solvent for carbohydrate materials and readily forms a homogeneous reaction system, permitting oxidation to proceed quite rapidly with the production of good yields of uronic acids. The use of a homogeneous system presents further advantages, particularly in commercial scale operations, in that it makes possible higher equipment capacity and more efficient reaction control. Another advantage is that the total reaction product can be recovered by the simple expedient of recovering excess oxidant by distillation, the pure uronic acid or its derivative then being recovered therefrom by appropriate procedures.

The present invention comprises oxidizing an aldose derivative in which the aldehyde function is suitably protected by dissolving the same in liquid nitrogen dioxide and allowing oxidation to proceed under controlled conditions to be hereinafter specified.

Carbohydrate materials applicable for use in the present invention include any aldose derivative of the glycoside type which is soluble in liquid nitrogen dioxide and in which the aldehyde function is protected by an acetal linkage and in which the primary alcohol group is free.

In carrying out the process of the present invention the aldose derivative in which the aldehyde function is suitably protected against oxidation, e. g. a glucoside, is dissolved in at least the minimum amount of liquid nitrogen dioxide necessary to effect complete dissolution, i. e. at least a sufficient amount to result in a homogeneous system. This minimum amount of nitrogen dioxide is generally a substantial excess over that theoretically required to oxidize the given quantity of aldose derivative. In the case of methyl glucoside, for example, we have found that one and one-half parts by weight of liquid nitrogen dioxide are required to dissolve one part of methyl glucoside. Larger amounts of nitrogen dioxide have been found to offer no advantage, although we have found no evidence of increased undesirable over-oxidation if larger amounts are employed.

Since nitrogen dioxide freezes at −10° C. and boils at 24° C., temperatures above or below this range are less practical, the preferred range being 0° to 20° C.

As would be expected the rate of oxidation increases with increasing temperature. Although the reaction is exothermic, no difficulty has been encountered in maintaining control of the reaction within the preferred range of temperatures.

Various procedures may be used to refine the residue containing the oxidation products and to recover the uronic acid therefrom. After oxidation has been accomplished, the excess solvent-oxidant, i. e. the liquid nitrogen dioxide, is removed and recovered, for example by low temperature distillation. The resulting crude syrup contains, in addition to the oxidation products, a small percentage of residual nitrogenous compounds. These nitrogenous impurities may be substantially removed by various procedures, such as heating for a short time at a higher temperature, with or without the addition of compounds such as formaldehyde or methanol. Colored substances may be removed, for example, by extraction with solvents such as butanol, a commercial mixture of amyl alcohols sold under the trade-mark "Pentasol" or cyclohexanol; or the oxidation product may be taken up in a suitable solvent and treated with decolorizing carbon. Acidic components of the mixture may be separated from non-acidic components by ion exchange treatment of a suitable solution of the oxidation mixture. Dicarboxylic acids which may be formed by side reactions may be precipitated from a solution of the oxidation mixture and removed, for example, as their barium or calcium salts.

The uronic acid derivative may be hydrolyzed by any suitable means such as, for example, by heating in solution with sulfuric acid, phosphoric acid, hydrochloric acid, ethane-sulfonic acid or any of a number of cation exchange resins. The hydrolysis may take place at atmospheric or superatmospheric pressures. The uronic acid or its lactone may be recovered from the liquor by concentration to a sufficient extent for crystallization to occur, with or without removal of the hydrolysis catalyst. Crystallization may be effected from water; or various solvents such as, for example, acetic acid, isopropyl alcohol, butanol, tertiary butyl alcohol, acetone, dioxane or diacetone alcohol, may be added to facilitate crystallization.

The following examples which are intended as informative and typical only and not in a limiting sense, will further illustrate the invention. Reported yields of uronic acid are based on analysis by the naphthoresorcinol test.

*Example 1*

A 500 ml. round bottom flask equipped with a mechanical stirrer, thermometer, reflux condenser (cooled with ice water) and a dropping funnel was placed in a bath maintained at approximately 0° C. One hundred and seventy-five ml. of liquid nitrogen dioxide was placed in the flask, agitation was started, and 150 g. of methyl alpha-D-glucoside was added over a period of one hour with the reaction temperature maintained below 3° C. Samples were removed periodically. At the end of the reaction excess nitrogen dioxide was removed by distillation under diminished pressure at 0° C. in the course of about 15 minutes. The samples were dried by azeotropic distillation with ethanol-benzene and analyzed for uronic acid with the results shown in Table I below.

TABLE I

| Oxidation Time (Hrs.) | Uronic Acid in Products (Per Cent Dry Basis, Calc. as Glucuronic Acid) |
|---|---|
| 3 | 11 |
| 6 | 15 |
| 11 | 22 |
| 22 | 27 |
| 36 | 32 |
| 48 | 34 |

*Example 2*

The reaction described in Example 1 above was repeated, except that the oxidation temperature was approximately 10° C. instead of approximately 0° C. Results are shown below in Table II.

TABLE II

| Oxidation Time (Hrs.) | Uronic Acid in Products (Per Cent Dry Basis, Calc. as Glucuronic Acid) |
|---|---|
| 3 | 21 |
| 9 | 31 |
| 33 | 35 |
| 46 | 34 |

Example 3

The reaction described in Example 1 above was repeated, except that oxidation was carried out at approximately 20° C. instead of approximately 0° C. Results are given in Table III below:

TABLE III

| Oxidation Time (Hrs.) | Uronic Acid in Products (Per Cent Dry Basis, Calc. as Glucuronic Acid) |
|---|---|
| 1 | 27 |
| 2 | 32 |
| 4 | 38 |
| 6 | 39 |
| 9 | 42 |

Example 4

Four hundred g. of methyl gulcoside were dissolved in 500 ml. of liquid nitrogen dioxide and oxidized for a period of about 9 hours at approximately 20° C. Excess nitrogen dioxide was removed under diminished pressure at 20° C. The residual sirup constituting the total oxidation product was dissolved in methanol to a final volume of 2 liters. Analysis of a sample of this solution indicated it contained 126 g. of glucuronic acid.

The methanol solution was refluxed 4 hours to remove residual nitrogen. The methanol was then removed by distillation under reduced pressure. The resulting sirup was dissolved in water and passed over an anion exchanger to adsorb the acids, which were then eluted from the resin with a sulfuric acid solution.

A portion of the effluent from the anion exchanger containing 36.4 g. of glucuronic acid was concentrated at 40° C. under reduced pressure to 17.5% solids and then adjusted to 0.7 N with respect to sulfuric acid. The resulting solution was refluxed for 16 hours to hydrolyze the methyl glucuronoside, then cooled and extracted with one-fourth its volume of butanol-1. The aqueous layer was concentrated below 35° C. to approximately 75 percent solids, an equal volume of glacial acetic acid was added and distillation continued until crystallization began. After cooling over night in the refrigerator, the mixture was filtered. 17.7 g. of crystalline glucuronolactone were recovered.

We claim:

1. Process for the production of derivatives of uronic acids, which comprises dissolving an aldose derivative, having the aldehyde function protected by an acetal linkage and in which the primary alcohol group is free, in at least sufficient liquid nitrogen dioxide to attain a homogeneous system, and allowing oxidation to proceed for a sufficient time to oxidize a substantial proportion of the primary alcohol groups of the aldose derivative to carboxyl groups.

2. Process for the production of derivatives of hexuronic acids, which comprises dissolving an aldohexose derivative, having the aldehyde function protected by an acetal linkage and in which the primary alcohol group is free, in sufficient liquid nitrogen dioxide to attain a homogeneous system, and allowing oxidation to proceed for a sufficient time to oxidize a substantial proportion of the primary alcohol groups of the hexose derivative to carboxyl groups.

3. Process for the production of derivatives of glucuronic acid, which comprises dissolving a glucose derivative, having the aldehyde function protected by an acetal linkage and in which the primary alcohol group is free, in sufficient liquid nitrogen dioxide to attain a homogeneous system, and allowing oxidation to proceed for a sufficient time to oxidize a substantial proportion of the primary alcohol groups to carboxyl groups.

4. Process for the production of glucuronic acid, which comprises dissolving a glucose derivative, having the aldehyde function protected by an acetal linkage and in which the primary alcohol group is free, in sufficient liquid nitrogen dioxide to attain a homogeneous system, allowing oxidation to proceed for a sufficient time to oxidize a substantial proportion of the primary alcohol groups to carboxyl groups, removing excess nitrogen dioxide and thereafter hydrolyzing the glucuronic acid derivative and recovering glucuronic acid.

5. Process for the production of glucuronosides, which comprises dissolving a glucoside in sufficient liquid nitrogen dioxide to attain a homogeneous system, and allowing oxidization to proceed for a sufficient time to oxidize a substantial proportion of the primary alcohol groups to carboxyl groups.

6. Process for the production of glucuronic acid, which comprises dissolving a glucoside in sufficient liquid nitrogen dioxide to attain a homogeneous system and allowing oxidation to proceed for a sufficient time to oxidize a substantial proportion of the primary alcohol groups of the glucoside to carboxyl groups, removing excess nitrogen dioxide, and thereafter hydrolyzing the resultant glucuronoside and recovering the glucuronic acid.

7. Process for the production of glucuronic acid, which comprises dissolving one part of methyl glucoside in at least about 1.5 parts by weight of liquid nitrogen dioxide, allowing oxidation to proceed for a sufficient time to oxidize a substantial proportion of the primary alcohol group of methyl glucoside to form methyl glucuronoside, removing excess nitrogen dioxide, and thereafter hydrolyzing the methyl glucuronoside and recovering glucuronic acid.

8. Process for the production of glucuronic acid, which comprises dissolving one part of methyl glucoside in at least about 1.5 parts by weight of liquid nitrogen dioxide, at a temperature within the range of about —10° C. to about 24° C., allowing oxidation to proceed within the specified temperature range for a sufficient time to oxidize a substantial proportion of the primary alcohol groups of the methyl glucoside to form methyl glucuronoside, removing unreacted nitrogen dioxide, and thereafter hydrolyzing the methyl glucuronoside and recovering glucuronic acid.

9. Process for the production of glucuronic acid, which comprises dissolving methyl glucoside in at least 1.5 parts by weight of liquid nitrogen dioxide per part by weight of said methyl glucoside, at a temperature within the range of about 0° C. to about 20° C., allowing oxidation to proceed within said temperature range for sufficient time to oxidize a substantial proportion of the primary alcohol group of said methyl glucoside to form methyl glucuronoside, removing excess oxidant, and thereafter hydrolyzing said methyl glucuronoside and recovering glucuronic acid.

10. Process for the production of glucuronic acid, which comprises dissolving one part of methyl glucoside in at least 1.5 parts by weight of liquid nitrogen dioxide, at a temperature within the range of about 10° C. to about 24° C., allowing oxidation to proceed within the specified temperature range for from about 4 to about 12 hours to oxidize a substantial proportion of the primary alcohol groups of the methyl glucoside to form methyl glucuronoside, removing unreacted nitrogen dioxide, and thereafter hydrolyzing the methyl glucuronoside and recovering glucuronic acid.

11. Process for the production of glucuronic acid, which comprises dissolving methyl glucoside in 1.5 parts by weight of liquid nitrogen dioxide per part by weight of said methyl glucoside, allowing oxidation to proceed at approximately 20° C. for about 9 hours to form methyl glucuronoside, distilling off excess oxidant under diminished pressure, dissolving the oxidation products in methanol, refluxing said methanolic solution to remove residual oxidant, and thereafter hydrolyzing the methyl glucuronoside and recovering glucuronic acid.

12. Process for the production of derivatives of glucuronic acid, which comprises dissolving methyl glucoside in at least 1.5 parts by weight of liquid nitrogen dioxide per part by weight of methyl glucoside, allowing oxidation to proceed at a temperature within the range of about 0° C. to about 20° C., for a period of time sufficient to oxidize a substantial proportion of methyl glucoside to methyl glucuronoside, removing excess oxidant, recovering the glucuronoside by adsorbing it on an acid adsorbent resin and thereafter separating said glucuronoside from said resin.

13. Process for the production of glucuronic acid, which comprises dissolving methyl glucoside in at least 1.5 parts by weight of liquid nitrogen dioxide per part by weight of said methyl glucoside, allowing oxidation to proceed at a temperature within the range of about 0° C. to about 20° C., until a substantial proportion of the methyl glucoside is oxidized to methyl glucuronoside, removing excess oxidant, recovering methyl glucuronoside by adsorbing it on an acid adsorbent resin, thereafter separating said glucuronoside from said resin, hydrolyzing said glucuronoside to glucuronic acid and recovering glucuronic acid from the hydrolyzate.

DEAN H. COUCH.
ELONZA A. CLEVELAND.

REFERENCES CITED

The following references are of record in the file of this patent:

Pigman, Chemistry of Carbohydrates, pp. 332–334, Academic Press Inc., N. Y., 1948.

Maurer, Chemische Berichte, 75, 1489–1491 (1942).